United States Patent
Labranche et al.

(10) Patent No.: US 8,257,619 B2
(45) Date of Patent: *Sep. 4, 2012

(54) LEAD-FREE RESISTIVE COMPOSITION

(75) Inventors: Marc H. Labranche, Chapel Hill, NC (US); Kenneth Warren Hang, Hillsborough, NC (US); Alfred T. Walker, Oxford, PA (US); Constance Wenger, legal representative, Oxford, PA (US); Yuko Ogata, Tochigi (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 152 days.

This patent is subject to a terminal disclaimer.

(21) Appl. No.: 12/425,048

(22) Filed: Apr. 16, 2009
(Under 37 CFR 1.47)

(65) Prior Publication Data
US 2011/0089381 A1    Apr. 21, 2011

Related U.S. Application Data

(60) Provisional application No. 61/046,282, filed on Apr. 18, 2008.

(51) Int. Cl.
*H01B 1/20* (2006.01)
*C03C 8/02* (2006.01)
*H01C 7/00* (2006.01)

(52) U.S. Cl. .................... 252/518.1; 338/22 R
(58) Field of Classification Search ............ 252/518.1; 338/22 R
See application file for complete search history.

(56) References Cited

U.S. PATENT DOCUMENTS

| | | | | |
|---|---|---|---|---|
| 4,051,074 | A * | 9/1977 | Asada | 252/503 |
| 4,312,770 | A * | 1/1982 | Yu et al. | 252/514 |
| 4,651,126 | A * | 3/1987 | Kumar et al. | 338/309 |
| 5,474,711 | A | 12/1995 | Borland et al. | |
| 5,491,118 | A | 2/1996 | Hormadaly | |
| 5,534,194 | A | 7/1996 | Borland et al. | |
| 6,544,654 | B1 * | 4/2003 | Fukaya et al. | 428/432 |
| 7,481,953 | B2 * | 1/2009 | Tanaka et al. | 252/514 |
| 2009/0261307 | A1 * | 10/2009 | Hayakawa et al. | 252/519.13 |

FOREIGN PATENT DOCUMENTS

| | | |
|---|---|---|
| EP | 0 132 810 A1 | 2/1985 |
| JP | 2005244115 A | 9/2009 |
| WO | 93/23855 A1 | 11/1993 |
| WO | 99/63553 A1 | 12/1999 |

OTHER PUBLICATIONS

PCT International Search Report, Jul. 27, 2009.

* cited by examiner

*Primary Examiner* — Mark Kopec

(57) ABSTRACT

A substantially lead-free thick-film resistor paste composition is disclosed including a resistor composition dispersed in an organic vehicle. The resistor composition includes (a) $RuO_2$ conductive material; (b) an α-oxide selected from CuO, $Na_2O$, $K_2O$, $Li_2O$ and combinations thereof (c) a borosilicate glass composition having: (i) $B_2O_3$, (ii) $SiO_2$, (iii) a δ-oxide selected from BaO, CaO, ZnO, SrO, MgO and combinations thereof, and optionally including any of (iv) $P_2O_5$, (v) $ZrO_2$ and (vi) $Al_2O_3$. The CuO α-oxide and $TiO_2$, $Ta_2O_5$, $Nb_2O_5$ β-oxide(s) and combinations thereof are present in the paste composition either separately, or in the borosilicate glass composition, or both. The $Na_2O$, $K_2O$, $Li_2O$ α-oxide(s) and combinations thereof are present in the borosilicate glass composition. TCR values in the range of +/−100 ppm/° C. and R values of 100 ohms to 10 mega-ohms per square are obtained by resistors made from the paste composition.

16 Claims, No Drawings

LEAD-FREE RESISTIVE COMPOSITION

FIELD OF THE INVENTION

This invention relates to a substantially lead-free composition useful for producing a thick film resistor, and specifically to a composition using ruthenium oxide as the conducting component, and resistors made therefrom.

TECHNICAL BACKGROUND

Formulated ceramic resistor compositions are widely used in thick film resistor electrical parts, thick film hybrid circuits, etc. They are compositions for preparing a resistive thick film by printing the composition on a conductor pattern or other electrodes formed on the surface of an insulating substrate, followed by firing the print to form the resistor.

The thick film resistor composition is prepared by dispersing a conducting component and an inorganic binder in an organic medium (vehicle). The conducting component, such as ruthenium oxide, inorganic matrix material, such as inorganic glasses, and organic medium component are mixed and deposited on the substrate by many known methods. Following the fusion of the deposited layer, the choice of inorganic and conductive components largely determines the electrical properties of the thick film resistor. The inorganic binder comprises glass, and has a major role of retaining the thick film integrally and binding it to the substrate. The organic medium is a dispersing medium that affects the application properties, particularly the rheology, of the composition.

Traditional thick film resistors have relied on the use of lead-containing glasses. In addition, lead ruthenate ($PbRuO_3$) conductive oxide is often employed in resistors with sheet resistivity of at least 1000 ohm/sq, and especially 10,000 ohm/sq and higher. On the other hand, there is increasing environmental concern around the use of lead in commercial products, so a high quality Pb-free resistor system is desirable.

U.S. Pat. No. 7,481,953 to Tanaka, et al takes an approach focused on the addition of $BaTiO_3$ and Ag to a CaO based glass composition and a ruthenium containing conductive material to form a substantially lead-free resistor composition.

Commonly assigned U.S. Pat. No. 5,491,118 to Hormadaly discloses a cadmium-free and lead-free thick film composition suitable for resistors and thermistors. $Bi_2O_3$ containing glasses are used, which provide a high and negative TCR. Also, Hormadaly discloses that the addition of MgO, $Nb_2O_5$ and $TiO_2$ TCR drivers is to be avoided for their deleterious effects on resistance and also the stability of the resultant pastes.

Thus, when making substantially lead-free resistors, the challenge is to provide novel glass chemistries that must work with substantially lead-free conductive oxides. Because lead ruthenate cannot be used, developing a substantially lead-free system is particularly difficult for resistor values above approximately 1000 ohm/square.

The difficulty is not limited to just the resistance but also extends to the temperature coefficient of resistance (TCR) being held within ±100 ppm/° C. Both hot TCR (HTCR) and cold TCR (CTCR) are usually reported, with HTCR typically being measured between room temperature and 125° C., while CTCR between room temperature and −55° C. The elimination of Pb from the resistor requires novel glass chemistries to control both resistivity and TCR, either individually or in combination.

SUMMARY OF THE INVENTION

The invention provides substantially lead-free resistor pastes and resistors having novel glass chemistries that work with substantially lead-free conductive oxides. The invention also provides a substantially lead-free system having resistor values above approximately 1000 ohm/square. The invention further provides substantially lead-free resistor pastes and resistors having a temperature coefficient of resistance (TCR) within ±100 ppm/° C. Furthermore, the invention provides the combination of (TCR) values within ±100 ppm/° C. together with resistor values above approximately 1000 ohm/square.

In embodiments of the invention, a substantially lead-free thick-film resistor paste composition is provided including a resistor composition dispersed in an organic vehicle, the resistor composition comprising: $RuO_2$ conductive material; an α-oxide selected from the group consisting of CuO, $Na_2O$, $K_2O$, $Li_2O$ and combinations thereof; a borosilicate glass composition comprising: (i) $B_2O_3$, (ii) $SiO_2$, (iii) a δ-oxide selected from the group consisting of BaO, CaO, ZnO, SrO, MgO and combinations thereof, and optionally including any of (iv) $P_2O_5$, (v) $ZrO_2$ and (vi) $Al_2O_3$, and wherein said CuO α-oxide is present in the paste composition either separately, or in the borosilicate glass composition, or both, and wherein said $Na_2O$, $K_2O$, $Li_2O$ α-oxide(s) and combinations thereof are present in the borosilicate glass composition; and a β-oxide selected from the group consisting of $TiO_2$, $Ta_2O_5$, $Nb_2O_5$ and combinations thereof; wherein said $TiO_2$, $Ta_2O_5$, $Nb_2O_5$ β-oxide(s) and combinations thereof are present in the paste composition either separately, or in the borosilicate glass composition, or both.

In other embodiments of the invention, a composition is provided wherein the resistor paste has 30-80 wt % resistor composition, and 70-20 wt % organic vehicle, wherein the conductive composition comprises from about 5 to about 30 wt % $RuO_2$ conductive material, 50-92 wt % α-oxide plus borosilicate glass composition plus β-oxide, and 0-30% ceramic filler, the ceramic filler selected from the group consisting of $SiO_2$, $Al_2O_3$, $ZrO_2$, $ZrSiO_4$ and mixtures thereof.

The α-oxide plus borosilicate glass composition plus β-oxide, based upon the weight of said α-oxide plus borosilicate glass composition plus β-oxide, may comprise as α-oxide 0.1-14 wt %, or alternately 0.3-8 wt %, of said CuO and/or 0.1-12 wt %, or alternately 1-8 wt %, of the total of said $Na_2O$ plus said $K_2O$ plus said $Li_2O$; as borosilicate glass composition 10-60 wt % $SiO_2$, 5-40 wt % $B_2O_3$, 10-45 wt % δ-oxide, 0-20 wt % $Al_2O_3$, 0-5 wt % $ZrO_2$ and 0-15 wt % $P_2O_5$; and as β-oxide 0.4-8 wt % of the total of said $TiO_2$ plus said $Ta_2O_5$ plus said $Nb_2O_5$; and with the proviso that, as discussed above, the CuO α-oxide and the β-oxide are present in the paste composition either separately, or in the borosilicate glass composition, or both; and with the further proviso that any of α-oxides $Na_2O$, $K_2O$ and $Li_2O$ are present in the borosilicate glass.

In some embodiments of the invention the α-oxide plus borosilicate glass composition plus β-oxide, based upon the weight of said α-oxide plus borosilicate glass composition plus β-oxide, comprises as α-oxide 4-11 wt % of said $Na_2O$ and/or 0.4-2 wt % of said $K_2O$ and/or 0.1-2.0 wt % of said $Li_2O$.

In other embodiments of the invention the ratio of said CuO to said β-oxide selected from the group consisting of $TiO_2$, $Ta_2O_5$, $Nb_2O_5$ and combinations thereof or precursor(s) thereof [$CuO/(TiO_2+Ta_2O_5+Nb_2O_5)$] is from about 0 to about 3.

The invention also provides a thick-film resistor formed from a substantially lead-free thick-film resistor paste composition including a resistor composition dispersed in an organic vehicle, said resistor composition comprising: $RuO_2$ conductive material; an α-oxide selected from the group consisting of CuO, $Na_2O$, $K_2O$, $Li_2O$ and combinations thereof; a borosilicate glass composition comprising: (i) $B_2O_3$, (ii) $SiO_2$, (iii) a δ-oxide selected from the group consisting of BaO, CaO, ZnO, SrO, MgO and combinations thereof, and optionally including any of (iv) $P_2O_5$, (v) $ZrO_2$ and (vi) $Al_2O_3$, and wherein said CuO α-oxide is present in the paste composition either separately, or in the borosilicate glass composition, or both, and wherein said $Na_2O$, $K_2O$, $Li_2O$ α-oxide(s) and combinations thereof are present in the borosilicate glass composition; and a n-oxide selected from the group consisting of $TiO_2$, $Ta_2O_5$, $Nb_2O_5$ and combinations thereof; wherein said $TiO_2$, $Ta_2O_5$, $Nb_2O_5$ β-oxide(s) and combinations thereof are present in the paste composition either separately, or in the borosilicate glass composition, or both.

The thick film resistor according to the invention may have a TCR in the range of +/−100 ppm, an R value from about 100 ohms to about 10 mega-ohms per square, or from about 1000 ohms to 500,000 ohms per square, or both such TCR and resistance values.

DETAILED DESCRIPTION OF THE INVENTION

Definitions

In accordance with the invention, certain oxide groupings have been defined, as well as the manner in which they are incorporated into the paste composition, in accordance with the invention. Alpha oxides (α-oxides) are defined as being from the group of CuO, $Na_2O$, $K_2O$, $Li_2O$ and combinations thereof. CuO α-oxide is present in the paste composition either separately, or in the borosilicate glass composition, or both. The $Na_2O$, $K_2O$, $Li_2O$ α-oxide(s) and combinations thereof are present in the borosilicate glass composition. Delta oxides (δ-oxides) are defined as being from the group of BaO, CaO, ZnO, SrO, MgO and combinations thereof. Delta oxides (δ-oxides) are present in the borosilicate glass composition. Beta oxides (β-oxides) are defined as being from the group of $TiO_2$, $Ta_2O_5$, $Nb_2O_5$ and combinations thereof. The $TiO_2$, $Ta_2O_5$ & $Nb_2O_5$ β-oxide(s) and combinations thereof are present in the paste composition either separately, or in the borosilicate glass composition, or both.

Note that in the present invention, "substantially free of lead" means not containing any lead above the level of an impurity. The level of an impurity (for example, a content in the glass composition of 0.05 wt % or less) may be contained. Lead is sometimes contained in extremely small amounts as an unavoidable impurity in the glasses in accordance with the invention or in other compositional elements of the resistor paste and the resistor.

Glass Compositions

In Table 1, a series of glass compositions in accordance with the invention are listed as illustrative of glass materials that may be used in paste formulations in accordance with the invention to achieve desired resistor property characteristics. These glass materials may be used as mixtures of one or more glass compositions. Optionally, a small addition of one of more oxides may be required in order to achieve a final composition suited to the achievement of a paste composition in accordance with the invention, comprising a conductive material such as ruthenium oxide, a final glass mixture, added oxides, and oxide compounds formulated in an organic medium to form a paste suitable for application to a substrate.

TABLE 1

Example Glass Compositions:

| Weight % Glass # | $SiO_2$ | $Al_2O_3$ | $ZrO_2$ | $B_2O_3$ | CaO | ZnO | CuO | BaO | MgO | $Nb_2O_5$ |
|---|---|---|---|---|---|---|---|---|---|---|
| 1 | 16.90 | | 3.00 | 38.30 | | | | 37.50 | 4.30 | |
| 2 | 67.00 | 4.00 | | | 0.30 | 5.00 | | 6.00 | 0.10 | |
| 3 | 21.70 | 5.70 | 4.00 | 26.70 | 4.00 | 27.60 | | 1.60 | | |
| 4 | 51.65 | 2.84 | | 5.82 | | 11.66 | 5.70 | 7.32 | | |
| 5 | 58.30 | | | 6.04 | | 14.66 | 6.65 | | | |
| 6 | 3.99 | | | 19.00 | | 57.01 | 2.35 | | | 17.65 |
| 7 | 81.00 | 2.00 | | 13.00 | | | | | | |
| 8 | 50.22 | 12.80 | | 7.00 | 29.00 | | | | 0.20 | |
| 9 | 12.78 | 15.77 | | 18.17 | 3.25 | 25.17 | | | | |
| 10 | 49.00 | 5.30 | | 5.84 | | 11.71 | 5.72 | 7.36 | | |
| 11 | 49.47 | 2.80 | 2.90 | 5.73 | | 11.49 | 5.61 | 7.21 | | |
| 12 | 43.44 | 2.97 | | 12.15 | | 12.17 | 5.95 | 7.65 | | |
| 13 | 19.41 | 5.12 | 3.59 | 23.99 | 3.50 | 13.34 | 2.82 | 20.18 | | |
| 14 | 45.53 | 2.50 | | 5.13 | | 10.28 | 5.58 | 16.79 | | |

| Weight % Glass # | $Na_2O$ | $Li_2O$ | $Ta_2O_5$ | SrO | $P_2O_5$ | $TiO_2$ | $K_2O$ | FeO |
|---|---|---|---|---|---|---|---|---|
| 1 | | | | | | | | |
| 2 | 6.00 | 0.60 | | 5.00 | | | 6.00 | |
| 3 | 8.70 | | | | | | | |
| 4 | 4.93 | | 5.28 | 3.30 | | | 1.50 | |
| 5 | 10.87 | | | | | 3.47 | | |
| 6 | | | | | | | | |
| 7 | 4.00 | | | | | | | |
| 8 | 0.31 | | | | | 0.23 | 0.12 | 0.12 |
| 9 | 5.39 | 1.73 | | 4.01 | 13.72 | | | |
| 10 | 4.95 | | 5.30 | 3.31 | | | 1.51 | |
| 11 | 4.86 | | 5.20 | 3.25 | | | 1.48 | |
| 12 | 5.15 | | 5.51 | 3.44 | | | 1.57 | |

TABLE 1-continued

Example Glass Compositions:

| | | | | |
|---|---|---|---|---|
| 13 | 7.27 | 0.78 | | |
| 14 | 0.65 | 4.65 | 7.56 | 1.32 |

When the glass or glasses, conductive oxide, added oxides, and optionally oxide compounds are formulated to make a paste, then printed and dried to form a thin layer on a suitable substrate provided with terminating conductor pads, and the layer is then thermally processed, it is expected to yield a resistive layer termed a "thick film resistor."

The glasses were melted in platinum rhodium alloy crucibles at a temperature in the range of 1350 to 1550° C. The batch materials were oxide materials with the exception of alkali and alkaline earth oxide constituents that were batched in the form of their respective carbonates. The batch materials were weighed and mixed thoroughly before melting. The phosphorous pentoxide was added in the form of a pre-reacted phosphate compound, such as $Ba_2P_2O_7$, $BaP_2O_6$, or $BPO_4$; however, the choice is not limited to these examples. The boron was added as boric anhydride. Amorphous silica was used as the source of $SiO_2$. The glass was melted for 1 to 4 hours, stirred, and quenched. The glass was quenched in water or by metal roller. The glass was then ball milled in water to a 5 to 7 micron powder using ½" zirconia cylinder media. The glass slurry was screened through a 325-mesh screen to remove the potential presence of oversize particles. The slurry was dried at 100° C. and then milled again in water to a final $d_{50}$ size of about 1 to 2 micron. The dried glass powder was then baked to 175° C. and was then ready to be used in resistor formulation. This drying step was used to remove surface moisture.

Paste Formulation

Typically, a resistor paste consists of conductive particles, glass powder, and optional additives dispersed in an organic medium to produce a screen-printable paste. The procedures for making such paste are known in the art. Using $RuO_2$ as the conductive material and glass compositions from Table 1, resistances between 1 kilo-ohms/sq. and 500 kilo-ohm/sq. are achieved with conductive loadings between approximately 4-18 weight % of the thick-film paste. In embodiments of the invention, the (paste contains 60 weight % of conductive and glass composition(s) from Table 1.

The $RuO_2$ is a fine powder with a surface area of 10 to 70 $m^2/g$, with a surface area above 20 $m^2/g$ being used in certain embodiments of the invention. In other embodiments of the invention, the conductive material may consist essentially of $RuO_2$.

The inorganic components were mixed with an organic medium by mechanical mixing to form viscous compositions called "pastes," having suitable consistency and rheology for screen printing. A wide variety of inert viscous materials can be used as the organic medium. The organic medium is one in which the inorganic components are dispersible with an adequate degree of stability. The rheological properties of the medium are such that they lend good application properties to the composition, including: stable dispersion of solids, appropriate viscosity and thixotropy for screen printing, appropriate wettability of the substrate and the paste solids, a good drying rate, and good firing properties. The organic medium used in the thick-film composition of the present invention may be a non-aqueous inert liquid. Use can be made of any of various organic mediums, which may or may not contain thickeners, stabilizers, and/or other common additives. The organic medium is typically a solution of polymer(s) in solvent(s). Additionally, a small amount of additives, such as surfactants, may be a part of the organic medium. The most frequently used polymer for this purpose is ethyl cellulose. Other examples of polymers include ethyl hydroxyethyl cellulose, wood rosin, mixtures of ethyl cellulose and phenolic resins, polymethacrylates of lower alcohols, and monobutyl ether of ethylene glycol monoacetate can also be used. The most widely used solvents found in thick-film compositions are ester alcohols and terpenes such as alpha or beta terpineol or mixtures thereof with other solvents such as kerosene, dibutyl phthalate, butyl carbitol, butyl carbitol acetate, hexylene glycol, and high-boiling alcohols and alcohol esters. In addition, volatile liquids for promoting rapid hardening after application on the substrate can be included in the medium. Suitable surfactants for $RuO_2$-based resistors include soya lecithin and alkali phosphates. Various combinations of these and other solvents are formulated to obtain the viscosity and volatility requirements desired. Except where noted, terpineol plus ethyl cellulose vehicle was used in the current examples.

The ratio of organic medium in the thick-film composition to the inorganic components in the dispersion is dependent on the method of applying the paste and the kind of organic medium used, as well as the desired print thickness achieved from screen printing. Usually, the dispersion will contain 40 to 80 weight % of inorganic components and 60 to 20 weight % of organic medium.

The powders were wetted by the organic medium by centrifugal mixing. The examples were 50 grams batch size, and used a Thinky mixer (Laguna Hills, Calif.). Impeller stirrers could be used for mixing larger volumes of paste. Final dispersion of powder particles was accomplished by the use of a three-roll mill such as the Ross (Hauppauge, N.Y.) three-roll mill (floor model with 4 inch [10.16 cm] diameter×8 inch [20.32 cm] long rolls). A final paste viscosity between 100 and 300 Pa-sec. was used for screen printing (as measured at 10 rpm and 25° C. with a Brookfield HBT viscometer [Middleboro, Mass.] with #14 spindle and 6R cup). Occasionally smaller samples were made by blending previously roll milled compositions with a Thinky mixer or on a glass surface. Screen printing was accomplished using an automatic screen printer (such as those from Engineering Technical Products, Sommerville, N.J.). A 400 mesh stainless steel screen was used to print 0.5×0.5 mm resistors with dried thickness in the range of approximately 12-17 microns. The resistors were printed on 1 inch (2.54 cm) squares of 96% alumina substrates. The substrates were 25 mils (0.635 mm) in thickness and were produced by CoorsTek (Golden, Colo.). The resistors were printed on a pattern of Ag thick-film terminations that had been previously fired to 850° C. DuPont Pb-free, Ag/Pt LF171 termination was fired using the recommended 30 minute firing profile with 10 minutes at the peak firing temperature (DuPont MicroCircuit Materials, Research Triangle Park, N.C.). Resistors were also fired at 850° C. using a 30 minute profile with 10 minutes at the peak temperature. A Lindberg Model 800 (Riverside, Mich.) 10-zone belt furnace with 233.5 inch (593.1 cm) belt length was used for all firings.

Resistances were measured at −55° C., 25° C., and 125° C. using a two-point probe method. A Keithley 2000 multimeter and Keithley 224 programmable current source (Cleveland, Ohio) were used to carry out the measurements. An S & A Engineering 4220AQ thermal test chamber (Scottsdale, Ariz.) was used to achieve the three measurement temperatures. Data is reported as R/sq. at 25° C. The CTCR is defined as $[(R_{25° C.}-R_{-55° C.})/(\Delta T \times R_{25° C.})] \times 1,000,000$. The HTCR is defined as $[(R_{125° C.}-R_{25° C.})/(\Delta T \times R_{25° C.})] \times 1,000,000$. The units of both HTCR and CTCR are ppm/° C.

EXAMPLES

TABLE 2

Resistor Paste Formulations:

| Glass # | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Experiment | | | | | | | | | | | | | | |
| Ex. # 1 | | | | | | 5.96 | | | 40.17 | | | | | |
| Ex. # 2 | | | | | | | | | | 43.00 | | | | |
| Ex. # 3 | | | | | | | | | 37.94 | | | | | |
| Ex. # 4 | | | | | | | | | 39.54 | | | | | |
| Ex. # 5 | | | | | 14.50 | | | | 36.50 | | | | | |
| Ex. # 6 | | | | | | 51.00 | | | | | | | | |
| Ex. # 7 | | | | | | | | | 39.80 | | | | | |
| Ex. # 8 | | | | | | | | | 50.64 | | | | | |
| Ex. # 9 | | | | | 25.50 | | | | 25.50 | | | | | |
| Ex. # 10 | | | | | 16.94 | | 7.06 | 7.06 | 16.94 | | | | | |
| Ex. # 11 | | | | | | | | | 25.50 | | | 25.50 | | |
| Ex. # 12 | | | | | 19.61 | | | | | | 23.85 | | | |
| Ex. # 13 | | | | | 21.00 | | | | 21.00 | | | | | |
| Ex. # 14 | | | | | 17.95 | | | | 17.95 | | | | | |
| Ex. # 15 | | | | | 17.33 | | | | 17.33 | | | | | |
| Ex. # 16 | 46.90 | | | | | | | | | | | | | |
| Ex. # 17 | | | | | | | | | | | | | 41.10 | 13.70 |
| Ex. # 18 | 44.00 | | | | | | | | | | | | 4.00 | |
| Ex. # 19 | | | | | | | | | 25.50 | | | | | 25.50 |
| Comparative Examples | | | | | | | | | | | | | | |
| Ex. # 20 | | 46.80 | | | | | | | | | | | | |
| Ex. # 21 | | | 3.76 | | | | | | 40.47 | | | | | |
| Ex. # 22 | | | 3.76 | | | | | | 44.24 | | | | | |

| | | | Additives | | | | Fillers | | | Amorph. | |
|---|---|---|---|---|---|---|---|---|---|---|---|
| | Glass # | RuO2 | CuO | Ta2O5 | TiO2 | Nb2O5 | Al2O3 | ZrO2 | ZrSiO4 | SiO2 | Organic |
| Experiment | | | | | | | | | | | |
| Ex. # 1 | | 13.87 | | | | | | | | | 40.00 |
| Ex. # 2 | | 17.00 | | | | | | | | | 40.00 |
| Ex. # 3 | | 15.00 | 3.53 | | | 3.53 | | | | | 40.00 |
| Ex. # 4 | | 14.52 | 2.97 | | 2.97 | | | | | | 40.00 |
| Ex. # 5 | | 9.00 | | | | | | | | | 40.00 |
| Ex. # 6 | | 9.00 | | | | | | | | | 40.00 |
| Ex. # 7 | | 10.00 | 7.00 | 3.20 | | | | | | | 40.00 |
| Ex. # 8 | | 9.06 | | 0.30 | | | | | | | 40.00 |
| Ex. # 9 | | 9.00 | | | | | | | | | 40.00 |
| Ex. # 10 | | 12.00 | | | | | | | | | 40.00 |
| Ex. # 11 | | 9.00 | | | | | | | | | 40.00 |
| Ex. # 12 | | 10.00 | | | | | 6.54 | | | | 40.00 |
| Ex. # 13 | | 9.00 | | | | | | | | 9.00 | 40.00 |
| Ex. # 14 | | 10.50 | | | | | | | 13.59 | | 40.00 |
| Ex. # 15 | | 9.50 | | | | | | 15.84 | | | 40.00 |
| Ex. # 16 | | 12.60 | 0.14 | 0.36 | | | | | | | 40.00 |
| Ex. # 17 | | 5.20 | | | | | | | | | 40.00 |
| Ex. # 18 | | 12.00 | | | | | | | | | 40.00 |
| Ex. # 19 | | 9.00 | | | | | | | | | 40.00 |
| Comparative Examples | | | | | | | | | | | |
| Ex. # 20 | | 13.20 | | | | | | | | | 40.00 |
| Ex. # 21 | | 12.00 | 3.76 | | | | | | | | 40.00 |
| Ex. # 22 | | 12.00 | | | | | | | | | 40.00 |

TABLE 3

Formulated Compositions (Exclusive of Conductive Oxide, Filler and Organic; Inclusive of glass and CuO, $Ta_2O_5$, $Nb_2O_5$ and $TiO_2$ additives)

|  | $SiO_2$ | $Al_2O_3$ | $ZrO_2$ | $B_2O_3$ | CaO | ZnO | CuO | BaO | MgO | $Nb_2O_5$ |
|---|---|---|---|---|---|---|---|---|---|---|
| Experiment | | | | | | | | | | |
| Ex. # 1 | 11.64 | 13.73 | | 18.28 | 2.83 | 29.28 | 0.30 | | | 2.28 |
| Ex. # 2 | 49.00 | 5.30 | | 5.84 | | 11.71 | 5.72 | 7.36 | | |
| Ex. # 3 | 10.77 | 13.30 | | 15.32 | 2.74 | 21.22 | 7.84 | | | 7.84 |
| Ex. # 4 | 11.11 | 13.71 | | 15.80 | 2.83 | 21.89 | 6.52 | | | |
| Ex. # 5 | 23.83 | 12.09 | | 14.66 | 2.33 | 21.33 | 1.62 | 2.08 | | |
| Ex. # 6 | 58.30 | | | 6.04 | | 14.66 | 6.65 | 0.00 | | |
| Ex. # 7 | 10.17 | 12.55 | | 14.46 | 2.59 | 20.04 | 14.00 | | | |
| Ex. # 8 | 12.70 | 15.68 | | 18.06 | 3.23 | 25.02 | | | | |
| Ex. # 9 | 32.22 | 9.31 | | 12.00 | 1.63 | 18.41 | 2.85 | 3.66 | | |
| Ex. # 10 | 42.04 | 8.75 | | 11.41 | 5.41 | 13.00 | 2.01 | 2.58 | 0.03 | |
| Ex. # 11 | 31.13 | 9.28 | 1.45 | 11.95 | 1.63 | 18.33 | 2.81 | 3.61 | | |
| Ex. # 12 | 50.19 | 4.19 | | 5.83 | 0.00 | 11.69 | 5.71 | 7.34 | | |
| Ex. # 13 | 32.22 | 9.31 | | 12.00 | 1.63 | 18.41 | 2.85 | 3.66 | | |
| Ex. # 14 | 32.22 | 9.31 | | 12.00 | 1.63 | 18.41 | 2.85 | 3.66 | | |
| Ex. # 15 | 32.22 | 9.31 | | 12.00 | 1.63 | 18.41 | 2.85 | 3.66 | | |
| Ex. # 16 | 16.72 | | 2.97 | 37.89 | | | 0.30 | 37.10 | 4.25 | |
| Ex. # 17 | 37.43 | 3.51 | 0.90 | 15.11 | 0.88 | 12.46 | 5.17 | 10.78 | | |
| Ex. # 18 | 19.11 | 0.25 | 2.75 | 36.12 | | 1.01 | 0.50 | 35.01 | 3.94 | |
| Ex. # 19 | 29.16 | 9.14 | | 11.65 | 1.63 | 17.72 | 2.79 | 8.39 | | |
| Comparitive Examples | | | | | | | | | | |
| Ex. # 20 | 67.00 | 4.00 | | | 0.30 | 5.00 | | 6.00 | 0.10 | |
| Ex. # 21 | 12.48 | 13.74 | 0.31 | 17.42 | 3.06 | 23.39 | 7.84 | 0.13 | | |
| Ex. # 22 | 13.48 | 14.98 | 0.31 | 18.84 | 3.31 | 25.36 | | 0.13 | | |

|  | $Na_2O$ | $Li_2O$ | $Ta_2O_5$ | SrO | $P_2O_5$ | $TiO_2$ | $K_2O$ | FeO |
|---|---|---|---|---|---|---|---|---|
| Experiment | | | | | | | | |
| Ex. # 1 | 4.70 | 1.51 | | 3.49 | 11.95 | | | |
| Ex. # 2 | 4.95 | | 5.30 | 3.31 | | | 1.51 | |
| Ex. # 3 | 4.55 | 1.46 | | 3.38 | 11.57 | | | |
| Ex. # 4 | 4.69 | 1.51 | | 3.48 | 11.93 | 6.52 | | |
| Ex. # 5 | 5.26 | 1.24 | 1.50 | 3.81 | 9.82 | | 0.43 | |
| Ex. # 6 | 10.87 | | | | | 3.47 | | |
| Ex. # 7 | 4.29 | 1.38 | 6.40 | 3.19 | 10.92 | | | |
| Ex. # 8 | 5.36 | 1.72 | 0.59 | 3.98 | 13.64 | | | |
| Ex. # 9 | 5.16 | 0.87 | 2.64 | 3.65 | 6.86 | | 0.75 | |
| Ex. # 10 | 4.28 | 0.61 | 1.86 | 2.58 | 4.84 | 0.03 | 0.55 | 0.02 |
| Ex. # 11 | 5.13 | 0.87 | 2.60 | 3.63 | 6.86 | | 0.74 | |
| Ex. # 12 | 4.95 | 0.00 | 5.29 | 3.31 | 0.00 | | 1.50 | |
| Ex. # 13 | 5.16 | 0.87 | 2.64 | 3.65 | 6.86 | | 0.75 | |
| Ex. # 14 | 5.16 | 0.87 | 2.64 | 3.65 | 6.86 | | 0.75 | |
| Ex. # 15 | 5.16 | 0.87 | 2.64 | 3.65 | 6.86 | | 0.75 | |
| Ex. # 16 | | | 0.76 | | | | | |
| Ex. # 17 | 5.68 | | 4.33 | 2.58 | | | 1.18 | |
| Ex. # 18 | 0.43 | | 0.46 | 0.29 | | | 0.13 | |
| Ex. # 19 | 3.02 | 0.87 | 2.33 | 5.78 | 6.86 | | 0.66 | |
| Comparitive Examples | | | | | | | | |
| Ex. # 20 | 6.00 | 0.60 | | 5.00 | | | 6.00 | |
| Ex. # 21 | 5.23 | 1.46 | | 3.38 | 11.57 | | | |
| Ex. # 22 | 5.65 | 1.60 | | 3.69 | 12.65 | | | |

The oxide compositions provided in Table 3 are calculated from the formulations detailed in Table 2. These calculations represent the overall chemical presence of oxide constituents derived from the glass and additive materials incorporated in the resistors as formulated.

TABLE 4

Formulated Composition by Oxide Group
(Exclusive of Conductive Oxide, Filler and Organic; Inclusive of glass and CuO, $Ta_2O_5$, $Nb_2O_5$ and $TiO_2$ additives)

| | CuO | Alkali | CuO + Alkali | $B_2O_3$ | $Al_2O_3$ in glass | $SiO_2$ in glass | (Ba + Ca + Zn + Sr + Mg) Oxides | $Ta_2O_5$ | $Nb_2O_5$ | $TiO_2$ |
|---|---|---|---|---|---|---|---|---|---|---|
| Example | | | | | | | | | | |
| Ex. # 1 | 0.3 | 6.21 | 6.51 | 18.28 | 13.73 | 11.64 | 35.60 | | 2.28 | |
| Ex. # 2 | 5.72 | 6.46 | 12.18 | 5.84 | 5.30 | 49.00 | 22.38 | 5.30 | | |
| Ex. # 3 | 7.84 | 6.01 | 13.85 | 15.32 | 13.30 | 10.77 | 27.34 | | 7.84 | |
| Ex. # 4 | 6.52 | 6.20 | 12.72 | 15.80 | 13.71 | 11.11 | 28.20 | | | 6.52 |
| Ex. # 5 | 1.62 | 6.93 | 8.55 | 14.66 | 12.09 | 23.83 | 29.55 | 1.50 | | |
| Ex. # 6 | 6.65 | 10.87 | 17.53 | 6.04 | | 58.30 | 14.66 | | | 3.47 |
| Ex. # 7 | 14.00 | 5.67 | 19.67 | 14.46 | 12.55 | 10.17 | 25.82 | 6.40 | | |
| Ex. # 8 | | 7.08 | 7.08 | 18.06 | 15.68 | 12.70 | 32.24 | 0.59 | | |
| Ex. # 9 | 2.85 | 6.78 | 9.63 | 12.00 | 9.31 | 32.22 | 27.36 | 2.64 | | |
| Ex. # 10 | 2.01 | 5.44 | 7.45 | 11.41 | 8.75 | 42.04 | 23.60 | 1.86 | | 0.03 |
| Ex. # 11 | 2.81 | 6.73 | 9.54 | 11.95 | 9.28 | 31.13 | 27.19 | 2.60 | | |
| Ex. # 12 | 5.71 | 6.45 | 12.16 | 5.83 | 4.19 | 50.19 | 22.33 | 5.29 | | |
| Ex. # 13 | 2.85 | 6.78 | 9.63 | 12.00 | 9.31 | 32.22 | 27.36 | 2.64 | | |
| Ex. # 14 | 2.85 | 6.78 | 9.63 | 12.00 | 9.31 | 32.22 | 27.36 | 2.64 | | |
| Ex. # 15 | 2.85 | 6.78 | 9.63 | 12.00 | 9.31 | 32.22 | 27.36 | 2.64 | | |
| Ex. # 16 | 0.30 | | 0.30 | 37.89 | | 16.72 | 41.36 | 0.76 | | |
| Ex. # 17 | 5.17 | 6.86 | 12.03 | 15.11 | 3.51 | 37.43 | 26.70 | 4.33 | | |
| Ex. # 18 | 0.50 | 0.56 | 1.06 | 36.12 | 0.25 | 19.11 | 40.26 | 0.46 | | |
| Ex. # 19 | 2.79 | 4.55 | 7.34 | 11.65 | 9.14 | 29.16 | 33.53 | 2.33 | | |
| Comparative Examples | | | | | | | | | | |
| Ex. # 20 | | 12.60 | 12.60 | | 4.00 | 67.00 | 16.40 | | | |
| Ex. # 21 | 7.84 | 14.53 | 14.53 | 17.42 | 13.74 | 12.48 | 29.95 | | | |
| Ex. # 22 | | 7.25 | 7.25 | 18.84 | 14.98 | 13.48 | 32.49 | | | |

| | (Ta + Ti + NB) oxides | CuO/ (Ta + Ti + Nb oxide) ratio | $RuO_2$/(glass + oxides + filler + $RuO_2$) ratio | Filler Type | Filler/glass + oxides + filler + $RuO_2$) ratio |
|---|---|---|---|---|---|
| Example | | | | | |
| Ex. # 1 | 2.28 | 0.13 | 0.231 | | |
| Ex. # 2 | 5.30 | 1.08 | 0.283 | | |
| Ex. # 3 | 7.84 | 1.00 | 0.250 | | |
| Ex. # 4 | 6.52 | 1.00 | 0.242 | | |
| Ex. # 5 | 1.50 | 1.08 | 0.150 | | |
| Ex. # 6 | 3.47 | 1.91 | 0.150 | | |
| Ex. # 7 | 6.40 | 2.19 | 0.167 | | |
| Ex. # 8 | 0.59 | 0.00 | 0.151 | | |
| Ex. # 9 | 2.64 | 1.08 | 0.150 | | |
| Ex. # 10 | 1.90 | 1.06 | 0.200 | | |
| Ex. # 11 | 2.60 | 1.08 | 0.150 | | |
| Ex. # 12 | 5.29 | 1.08 | 0.167 | $Al_2O_3$ | 0.109 |
| Ex. # 13 | 2.64 | 1.08 | 0.150 | $SiO_2$ | 0.150 |
| Ex. # 14 | 2.64 | 1.08 | 0.175 | $ZrSiO_4$ | 0.227 |
| Ex. # 15 | 2.64 | 1.08 | 0.158 | $ZrO_2$ | 0.264 |
| Ex. # 16 | 0.76 | 0.40 | 0.210 | | |
| Ex. # 17 | 4.33 | 1.19 | 0.0867 | | |
| Ex. # 18 | 0.46 | 1.08 | 0.200 | | |
| Ex. # 19 | 2.33 | 1.20 | 0.150 | | |
| Comparative Examples | | | | | |
| Ex. # 20 | | | 0.22 | | |
| Ex. # 21 | | | 0.20 | | |
| Ex. # 22 | | | 0.20 | | |

TABLE 5

Summary Resistor Properties - Examples

| Experiment | Dry Thickness (microns) | R (ohms/sq) | HTCR (ppm/° C.) | CTCR (ppm/° C.) |
|---|---|---|---|---|
| Ex. # 1 | 14.7 | 19,790 | −79 | −85 |
| Ex. # 2 | 15.1 | 4,194 | 28 | 57 |
| Ex. # 3 | 14.6 | 8,052 | −6 | 39 |
| Ex. # 4 | 14.6 | 12,242 | 52 | 75 |
| Ex. # 5 | 15.6 | 17,600 | 23 | 45 |
| Ex. # 6 | 17.0 | 26,858 | 27 | 37 |
| Ex. # 7 | 13.8 | 38,168 | −28 | −42 |
| Ex. # 8 | 15.5 | 72,673 | −63 | −75 |
| Ex. # 9 | 13.6 | 17,656 | 1 | 28 |
| Ex. # 10 | 15.5 | 46,073 | 43 | 73 |
| Ex. # 11 | 14.1 | 26,661 | −72 | −52 |
| Ex. # 12 | 13.9 | 171,191 | −45 | −41 |
| Ex. # 13 | 12.7 | 29,504 | 40 | 84 |
| Ex. # 14 | 11.9 | 101,437 | 41 | 61 |
| Ex. # 15 | 12.3 | 326,675 | 27 | 44 |
| Ex. # 16 | 11.5 | 7,179 | 19 | 36 |
| Ex. # 17 | 12.7 | 262,599 | −19 | 1 |
| Ex. # 18 | 13.7 | 12,602 | −16 | 9 |
| Ex. # 19 | 14.0 | 36,844 | −33 | −6 |
| Comparative Examples | | | | |
| Ex. # 20 | 17.4 | 1,370 | 950 | 932 |
| Ex. # 21 | 13.7 | 1,184 | 1,580 | 1,518 |
| Ex. # 22 | 13.8 | 4,222 | 467 | 456 |

Example 1

Example 1 used $RuO_2$ with a surface area of 24.6 m²/gram combined with glass 6 and glass 9, Table 1, mixed in a terpineol+ethyl cellulose vehicle, roll milled through a 1 mil gap for 2 passes at 100 psi pressure, 2 passes at 200 psi, then 2 passes at 400 psi. The total paste batch size was 50 grams. The paste was screen printed through a 400 mesh screen to produce 0.5×0.5 mm resistors with a dried thickness of approximately 14.7 microns. The print was dried at 150° C. for 10 minutes, then fired at a 30 minute profile with 10 minutes at a peak temperature of 850° C. The conductor used for terminating the resistor in example 1 was the Pb-free, Ag/Pt LF171.

The alpha oxides in Example 1 were CuO, $Na_2O$ and $Li_2O$, with the CuO present in glass 6, and the $Na_2O$ and $Li_2O$ in glass 9. The beta oxide in Example 1 was $Nb_2O_5$ present as a component in glass 6. The resistivity was 19,790 ohms/square, which is within a useful range for mid-range resistors. The HTCR was −79 ppm/° C. and CTCR was −85 ppm/° C., within the desired+/−100 ppm/° C. window.

The paste making details of the subsequent examples were in accordance with that used in Example 1, including the surface area of the $RuO_2$.

Example 2

Example 2 used the single glass 10 combined with $RuO_2$. The alpha oxides were CuO, $Na_2O$ and $K_2O$, with CuO present in the glass. The beta oxide was $Ta_2O_5$, which was also present in the glass. The resistivity and HTCR and CTCR are reported in Table 5.

Examples 3 and 4

The alpha oxides in Examples 3 and 4 were $Na_2O$ and $Li_2O$ present in glass 9, and CuO added as a separate oxide in the pastes. The beta oxide in Example 3 was $Nb_2O_5$ and in Example 4 was $TiO_2$, both of which were added as separate oxides in their respective pastes.

Example 5

The alpha oxides in Example 5 were $Na_2O$ present in glasses 4 and 9, $K_2O$ in glass 4, $Li_2O$ in glass 9, and CuO in glass 4. The beta oxide was $Ta_2O_5$ present in glass 4.

Example 6

Example 6 used the single glass 5 combined with $RuO_2$. The alpha oxides were CuO and $Na_2O$, with CuO present in the glass. The beta oxide $TiO_2$ was present in the glass.

Examples 7 and 8

The examples 7 and 8 used the single glass 9. Both $Na_2O$ and $Li_2O$ were alpha oxides from this glass. Examples 7 also used CuO as an alpha oxide added separately to the paste, though Example 8 did not use CuO at all. The beta oxide in Examples 7 and 8 was $Ta_2O_5$ added separately to both pastes.

Example 9

The alpha oxides in Example 9 were $Na_2O$ present in glasses 4 and 9, $K_2O$ in glass 4, $Li_2O$ in glass 9, and CuO in glass 4. The beta oxide $Ta_2O_5$ was present in glass 4.

Example 10

Example 10 employed a mixture of four glasses plus $RuO_2$. The alpha oxide $Na_2O$ was present in glasses 7, 8 and 9, $K_2O$ in glasses 4 and 8, $Li_2O$ in glass 9, and CuO in glass 4. The beta oxide $Ta_2O_5$ was present in glass 4, and $TiO_2$ in glass 8. Multiple glasses from Table 1, in this instance four, may be used in accordance with the invention to obtain the overall composition within the desired range.

Example 11

The alpha oxides in Example 11 were $Na_2O$ present in glasses 9 and 11, $K_2O$ in glass 11, $Li_2O$ in glass 9, and CuO in glass 11. The beta oxide $Ta_2O_5$ was present in glass 11. Glass 11 also has $ZrO_2$ as a glass component, which was not present in Examples 1-10.

Examples 12-15

Examples 12-15 have added oxide fillers as part of the resistor formulations. Aluminum oxide filler was used in Example 12, amorphous silica in Example 13, zircon in Example 14, and zirconia in Example 15. The following alpha oxides were used: Example 11: $Na_2O$, $K_2O$ and CuO from glasses 4 and 11; Examples 12-15: $Na_2O$, $K_2O$ and CuO from glass 4, and $Na_2O$ and $Li_2O$ from glass 9. The beta oxide was $Ta_2O_5$ present in glasses 4 and 10 in Example 12, and $Ta_2O_5$ present in glass 4 in Examples 13-15.

Example 16

A single, alkali-free glass 1 was used in Example 16, so the only alpha oxide was CuO added to the paste. The beta oxide was $Ta_2O_5$, also added to the paste.

Example 17

Example 17 employed the same terpineol+ethyl cellulose vehicle as Examples 1-16, but with 1% added tridecyl phosphate. The paste was roll milled through two passes at 0 psi, then eight passes at 400 psi. The alpha oxides were CuO, $Na_2O$ and $K_2O$ present in glasses 12 and 13, and the beta oxide was $Ta_2O_5$ also present in glasses 12 and 13. The composition had resistivity and TCR values in accordance with the invention, at the reduced $RuO_2$ level.

Example 18

The organic vehicle and roll mill protocol for Examples 18-22 were the same as Examples 1-16. The alpha oxides in Example 18 were CuO, $Na_2O$ and $K_2O$ present in glass 12. The beta oxide was $Ta_2O_5$, also present in glass 12.

Example 19

The alpha oxides in Example 19 were $Na_2O$ present in glasses 9 and 14, $K_2O$ in glass 14, $Li_2O$ in glass 9, and CuO in glass 14. The beta oxide $Ta_2O_5$ was present in glass 14.

Comparative Examples 20-22

The comparative examples 20-22 are not in accordance with the invention as they do not have a beta oxide component. Also, Example 20 does not have $B_2O_3$. The TCR values are very high, ranging from about 450 to 1500 ppm/C. These compositions would not make a useful resistor because +100/−100 ppm/° C. TCR is an acceptance criteria expected by industrial resistor manufacturers.

In contrast, examples 1 through 19 in accordance with the invention show considerable resistor compositional range and cover a significant range of sheet resistivity values all meeting the +100/−100 ppm/° C. TCR acceptance criteria expected by industrial resistor manufacturers.

In embodiments of the invention, the general compositional range of the formulated oxide compositions (for example as listed in Table 4) is $SiO_2$ 10-59 wt. %, $B_2O_3$ 5-38 wt. %, delta oxides (δ-oxides) 14-42 wt. %, CuO 0-14 wt. %, CuO+alkali constituents 0.3-20 wt. %, alkali constituents 0-11 wt. %, beta oxides (β-oxides) of the group ($Ta_2O_5$, $Nb_2O_5$, $TiO_2$) 0.4-8 wt. %, optional additions of $ZrO_2$ 0-2 wt. %, $P_2O_5$ 0-14 wt. % and $Al_2O_3$ 0-16 wt. %.

In an embodiment of the present invention, the glass frit of the resistor composition is substantially free of lead. In an aspect, the glass frit comprises delta oxides (δ-oxides. The δ-oxides included in this group may be 14-42 wt. %. In a further embodiment, the δ-oxides may comprise, individually, BaO 0-37 wt %, ZnO 0-30 wt. %, SrO 0-6 wt. %, CaO 0-6 wt. % and MgO 0-5 wt. %. In an embodiment, the alkali and CuO group α-oxides) may comprise CuO 0-14 wt. %, $K_2O$ 0-2 wt. %, $Na_2O$ 0-11 wt. %, $Li_2O$ 0-2 wt. %. The beta oxides of the ($TiO_2$, $Ta_2O_5$, $Nb_2O_5$) group may comprise $Ta_2O_5$ 0-7 wt. %, $Nb_2O_5$ 0-8 wt. %, and 0-7 wt. % $TiO_2$. In an embodiment, $P_2O_5$ may comprise 0-12 wt. % and $Al_2O_3$ may comprise 0-14 wt. %.

In other embodiments of the invention, the resistor glass composition may comprise one or more components selected from the group consisting of: $SiO_2$ 10-59 wt. %, $Al_2O_3$ 0-13 wt. %, $B_2O_3$ 5-38 wt. %, (alkali & CuO, i.e., α-oxides) group 0.3-20 wt. %, (alkaline earth-zinc oxide, i.e., delta oxides) group 14-42 wt. %, the beta oxides of the ($TiO_2$, $Ta_2O_5$, $Nb_2O_5$) group 1-7 wt. %. The glass frit may optionally comprise one or more components selected from the group consisting of: $ZrO_2$ 0-2 wt. %, and $P_2O_5$ 0-11 wt. %.

In an embodiment of the invention based on a selected sheet resistance range, the resistor glass composition may comprise $SiO_2$ 16-59 wt. %, $Al_2O_3$ 0-10 wt. %, $B_2O_3$ 6-38 wt. %, (alkali & CuO, i.e., α-oxides) group 0.3-18 wt. %, (alkaline earth-zinc oxide i.e., delta oxides) group 14-42 wt. %, the beta oxides of the ($TiO_2$, $Ta_2O_5$, $Nb_2O_5$) group 0.75-4 wt. %. The glass frit may optionally comprise $P_2O_5$ 0-7 wt. %.

In embodiments of the invention, the β-oxide comprises $Ta_2O_5$. In further embodiments of the invention, the borosilicate glass composition comprises: (i) 5-15 wt % $B_2O_3$, (ii) 40-55 wt % $SiO_2$, (iii) 15-35 wt % of a δ-oxide selected from the group consisting of BaO, CaO, ZnO, SrO, and combinations thereof, and wherein said CuO α-oxide is 2-8 wt %, said $Ta_2O_5$ β-oxide is 2-8% and said $Na_2O$, $K_2O$, $Li_2O$ α-oxide(s) and combinations thereof are 1-8 wt %, and optionally including any of (v) $ZrO_2$ 0-6 wt % and (vi) 0-8 wt % $Al_2O_3$, based upon the weight of said borosilicate glass composition. The invention also has embodiments wherein the ratio of said CuO to said β-oxide selected from the group consisting of $TiO_2$, $Ta_2O_5$, $Nb_2O_5$ and combinations thereof or precursor(s) thereof [$CuO/(TiO_2+Ta_2O_5+Nb_2O_5)$] is from about 0 to about 3.

The composition in accordance with the invention may also include one or more additives selected from the group consisting of: (a) a metal wherein said metal is selected from Zr, Cu, Ti, Nb, Ta, Mn, Si, Al, Ag; (b) a metal oxide of one or more of the metals selected from Zr, Cu, Ti, Nb, Ta, Mn, Si, Al, Ag; (c) any compounds that can generate the metal oxides of (b) upon firing; and (d) mixtures thereof.

An embodiment of the present invention relates to a resistor comprising the composition described above. The sheet resistance of the resistor may be between 100 ohms to 10 mega-ohms per square. The TCR of the resistor may be between −100 to 100 ppm/° C.

One of ordinary skill in the art will recognize that additions may be made using other metal oxides, glass forming oxides, refractory glass powders and crystalline oxides to the glass materials subject of this invention. Additionally, it is also possible to make blends of differing glass compositions to achieve nearly the same formulated composition in the resistor materials.

While the invention has been described with reference to specific embodiments chosen for purpose of illustration, it should be apparent that various modifications could be made thereto without departing from the basic concept and scope of the invention as set forth in the appended claims.

What is claimed is:

1. A substantially lead-free thick-film resistor paste composition including a resistor composition dispersed in an organic vehicle, said resistor composition comprising:
   (a) $RuO_2$ conductive material;
   (b) an α-oxide comprising CuO;
   (c) a borosilicate glass composition comprising: (i) $B_2O_3$, (ii) $SiO_2$, (iii) a δ-oxide selected from the group consisting of BaO, CaO, ZnO, SrO, MgO and combinations thereof, and optionally including any of (iv) $P_2O_5$, (v) $ZrO_2$ and (vi) $Al_2O_3$, and wherein said CuO α-oxide is present in the borosilicate glass composition, or both the paste composition separately and the borosilicate glass composition; and
   (d) a β-oxide comprising $Ta_2O_5$;
wherein said $Ta_2O_5$ β-oxide is present in the borosilicate glass composition, or both the paste composition separately and the borosilicate glass composition.

2. A composition according to claim 1 wherein said resistor paste has 30-80 wt % resistor composition, and 70-20 wt % organic vehicle, wherein said conductive composition comprises from about 5 to about 30 wt % $RuO_2$ conductive material, 50-92 wt % α-oxide plus borosilicate glass composition plus β-oxide, and 0-30% ceramic filler, said ceramic filler selected from the group consisting of $SiO_2$, $Al_2O_3$, $ZrO_2$, $ZrSiO_4$ and mixtures thereof.

3. A composition according to claim 2 wherein said α-oxide plus borosilicate glass composition plus β-oxide, based upon the weight of said α-oxide plus borosilicate glass composition plus β-oxide, comprises:
as α-oxide 0.1-14 wt % of said CuO:
as borosilicate glass composition 10-60 wt % $SiO_2$, 5-40 wt % $B_2O_3$, 10-45 wt % δ-oxide, 0-20 wt % $Al_2O_3$, 0-5 wt % $ZrO_2$ and 0-15 wt % $P_2O_5$: and
as β-oxide 0.4-8 wt % of said $Ta_2O_5$.

4. A composition according to claim 3 wherein said α-oxide plus borosilicate glass composition plus β-oxide, based upon the weight of said α-oxide plus borosilicate glass composition plus β-oxide, comprises:
as α-oxide 0.3-8 wt % of said CuO and/or 1-8 wt % of the total of said $Na_2O$ plus said $K_2O$ plus said $Li_2O$.

5. A composition according to claim 3 wherein said α-oxide plus borosilicate glass composition plus β-oxide, based upon the weight of said α-oxide plus borosilicate glass composition plus β-oxide, comprises:
as α-oxide 0.3-8 wt % of said CuO.

6. A composition according to claim 3 wherein said α-oxide plus borosilicate glass composition plus β-oxide, based upon the weight of said α-oxide plus borosilicate glass composition plus β-oxide, comprises:
as α-oxide 4-11 wt % of said $Na_2O$ and/or 0.4-2 wt % of said $K_2O$ and/or 0.1-2.0 wt % of said $Li_2O$.

7. A composition according to claim 1 wherein said β-oxide further comprises $TiO_2$.

8. A composition according to claim 1 wherein said borosilicate glass composition comprises: (i) 5-15 wt % $B_2O_3$, (ii) 40-55 wt % $SiO_2$, (iii) 15-35 wt % of a δ-oxide selected from the group consisting of BaO, CaO, ZnO, SrO, and combinations thereof, and wherein said CuO α-oxide is 2-8 wt %, said $Ta_2O_5$ β-oxide is 2-8%, and optionally including any of (v) $ZrO_2$ 0-6 wt % and (vi) 0-8 wt % $Al_2O_3$, based upon the weight of said borosilicate glass composition.

9. A composition according to claim 1 wherein the ratio of said CuO to said $Ta_2O_5$-[CuO/($Ta_2O_5$)] is from about 0 to about 3.

10. A composition according to claim 1 wherein said α-oxide further comprises $Na_2O$ present in the borosilicate glass composition.

11. A thick-film resistor formed from a substantially lead-free thick-film resistor paste composition including a resistor composition dispersed in an organic vehicle, said resistor composition comprising:
(a) $RuO_2$ conductive material;
(b) an α-oxide comprising CuO;
(c) a borosilicate glass composition comprising: (i) $B_2O_3$, (ii) $SiO_2$, (iii) a δ-oxide selected from the group consisting of BaO, CaO, ZnO, SrO, MgO and combinations thereof, and optionally including any of (iv) $P_2O_5$, (v) $ZrO_2$ and (vi) $Al_2O_3$, and wherein said CuO α-oxide is present in the borosilicate glass composition, or both the paste composition separately and the borosilicate glass composition; and
(d) a β-oxide comprising $Ta_2O_5$;
wherein said $Ta_2O_5$ β-oxide is present in the borosilicate glass composition, or both the paste composition separately and the borosilicate glass composition.

12. A thick film resistor according to claim 11 having a TCR in the range of +/−100 ppm/° C.

13. A thick film resistor according to claim 11 having an R value from about 100 ohms to 10 mega-ohms per square.

14. A thick film resistor according to claim 11 having an R value from about 1000 ohms to 500,000 ohms per square.

15. A thick film resistor according to claim 11 wherein said α-oxide further comprises $Na_2O$ present in the borosilicate glass composition.

16. A thick film resistor according to claim 11 wherein said β-oxide further comprises $TiO_2$.

* * * * *